(12) United States Patent
Weissman et al.

(10) Patent No.: US 9,960,794 B2
(45) Date of Patent: May 1, 2018

(54) OVER THE AIR ACQUISITION OF RADIO FREQUENCY IMPAIRMENT INFORMATION

(71) Applicant: QUALCOMM Incorporated, San Diego, CA (US)

(72) Inventors: Haim Mendel Weissman, Haifa (IL); Igor Gutman, Ramat Gan (IL); Joseph Patrick Burke, Glenview, IL (US); Vijay Chellappa, San Diego, CA (US); Sumit Verma, San Diego, CA (US); Paul Draxler, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/274,941

(22) Filed: Sep. 23, 2016

(65) Prior Publication Data

US 2017/0366209 A1  Dec. 21, 2017

Related U.S. Application Data

(60) Provisional application No. 62/352,445, filed on Jun. 20, 2016.

(51) Int. Cl.
*H04L 27/38* (2006.01)
*H04B 1/04* (2006.01)
(Continued)

(52) U.S. Cl.
CPC ........... *H04B 1/0475* (2013.01); *H04B 17/23* (2015.01); *H04B 17/24* (2015.01); *H04B 17/309* (2015.01);
(Continued)

(58) Field of Classification Search
CPC ...... H04B 1/0475; H04B 17/23; H04B 17/24; H04B 2001/0433
See application file for complete search history.

(56) References Cited

U.S. PATENT DOCUMENTS 8,565,343 B1 * 10/2013 Husted ................. H04B 1/0475
375/297

2002/0069038 A1 * 6/2002 Cooper ................. H04L 1/0009
702/191
(Continued)

FOREIGN PATENT DOCUMENTS

JP    2010278575 A    12/2010

OTHER PUBLICATIONS

Asami K., et al., "Novel Estimation Method of EVM with Channel Correction for Linear Impairments in Multi-standard RF Transceivers", 2013 IEEE 31st VLSI Test Symposium (VTS), Apr. 29, 2013, pp. 1-6, XP032431780, DOI: 10.1109/VTS.2013.6548890, ISBN: 978-1-4673-5542-1.
International Search Report and Written Opinion—PCT/US2017/033548—ISA/EPO—dated Oct. 27, 2017.

*Primary Examiner* — Kenneth Lam
(74) *Attorney, Agent, or Firm* — Qualcomm IP Dept.; James Hunt Yancey, Jr.

(57) ABSTRACT

Systems and methods for providing indications about the TX RF non-linear impairments are disclosed. In accordance with some implementations, a first device (UE or base station) estimates EVM indications for the signal and determines if the EVM indications is above a threshold. The first device may transmit the estimated TX non-linearity indications such as AM-AM, AM-PM, Volterra coefficients, and/or other performance metrics to a second device, that transmitted the signal, when it is determined that the EVM indications is above the threshold. Systems and methods for wireless communication impairment correction are also disclosed wherein, in accordance with some implementations, a first device receives estimated TX non-linearity indications such as AM-AM, AM-PM, and/or Volterra coefficients from a second device and performs non-linear correction of a transmit signal for the second receiver device based at least in part on the EVM indications. Other aspects, embodiments, and features are also claimed and described.

24 Claims, 9 Drawing Sheets

(51) Int. Cl.
    *H04B 17/23*         (2015.01)
    *H04B 17/24*         (2015.01)
    *H04B 17/309*       (2015.01)
    *H04B 17/354*       (2015.01)
    *H04B 17/373*       (2015.01)

(52) U.S. Cl.
    CPC ......... *H04B 17/354* (2015.01); *H04B 17/373* (2015.01); *H04L 27/38* (2013.01); *H04B 2001/0433* (2013.01)

(56) References Cited

U.S. PATENT DOCUMENTS

| | | |
|---|---|---|
| 2006/0072656 A1 | 4/2006 | Wiss et al. |
| 2008/0125045 A1* | 5/2008 | Nakao .................. H04L 1/0003<br>455/42 |
| 2009/0094492 A1* | 4/2009 | Music .................. G06F 11/261<br>714/715 |
| 2012/0020240 A1* | 1/2012 | Miura .................. H04J 11/0023<br>370/252 |
| 2012/0236974 A1 | 9/2012 | Horiuchi |
| 2012/0314746 A1* | 12/2012 | Lorenz ................. H03F 1/0216<br>375/224 |
| 2016/0043889 A1* | 2/2016 | Lozhkin ............. H04L 27/2623<br>375/295 |
| 2016/0381650 A1* | 12/2016 | Zou ....................... H04W 52/52<br>455/574 |

* cited by examiner

OVER THE AIR ACQUISITION OF RADIO FREQUENCY IMPAIRMENT INFORMATION

CROSS-REFERENCE TO RELATED APPLICATIONS

This application claims the benefit of U.S. Provisional Patent Application No. 62/352,445, entitled, "Over the Air Acquisition of Radio Frequency Impairment Information," filed on Jun. 20, 2016, the disclosure of which is hereby incorporated by reference herein in its entirety and for all applicable purposes.

TECHNICAL FIELD

Field

Aspects of the present disclosure relate generally to wireless communication systems, and more particularly, to acquisition of radio frequency impairment parameters over the air in a wireless communication system. Certain embodiments of the technology discussed below can enable and provide efficient estimation of radio frequency (RF) link impairments, such as associated with linear and non-linear distortions, by a receiver device and acquiring RF link impairment information over the air by a transmitter device, such as to implement RF link impairments correction.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

BRIEF SUMMARY OF SOME EMBODIMENTS

Radio frequency (RF) links, whether in the uplink (UL) or downlink (DL), suffer from linear and non-linear distortions resulting in error vector magnitude (EVM) in a received signal, and in power leakage to the adjacent channels. For example, the impairments with respect to any particular RF link may comprise non-linear distortions, such as due to operation of the transmit power amplifiers (PAs), as well as from linear distortions, such as due to the propagation channel (e.g., liner time invariant (LTI) impairments of the propagation channel).

Although attempts have been made to acquire information regarding RF link impairments, the existing solutions have made estimations regarding RF impairments at the transmitter, such as using one or more feedback receiver (FBRx). For example, a FBRx is used at the transmitting device, wherein couplers and an RF switch are used to accommodate the different transmitter device transmission paths (e.g., the multiple power amplifiers (PAs) feeding the multiple antennas of the MIMO antenna system). Accordingly, implementation of such prior solutions is based on optimization of each transmitter of the multiple output transmitters (i.e., multiple UL transmitters or multiple DL transmitters) standalone. The FBRx and its associated circuitry introduces complexity with respect to the solution and neither provides information regarding the overall array nor provides information with respect to the propagation channel. Such solutions are complex, focus on each transmit path separately, and/or do not take the overall propagation channel and the overall antenna array transmission RF impairments with the antenna array impact into account. Although a FBRx might be provided for each transmit path in an attempt to analyze transmit paths in parallel, such a configuration still requires couplers for each such transmission path, in addition to adding the complexity and associated increased power consumption of multiple FBRxs.

In one aspect of the disclosure, a method for providing radio frequency (RF) impairments indications is provided. In some scenarios, UEs may feedback RF impairment information to base stations. For example, a method can include estimating, by an intended receiver device (e.g., UE) for a signal, error vector magnitude (EVM) indications for the signal and determining, by the intended receiver device, if the EVM indications is above a threshold. The method further includes transmitting, by the intended receiver device to a transmitter device (e.g., base station) that transmitted the signal, the EVM indications when it is determined that the EVM indications is above the threshold.

In an additional aspect of the disclosure, an apparatus configured for providing radio frequency (RF) impairments indications is provided. The apparatus includes at least one processor, and a memory coupled to the processor. The at least one processor is configured to estimate, at an intended receiver device for a signal, error vector magnitude (EVM)

indications for the signal and to determine, at the intended receiver device, if the EVM indications is above a threshold. The at least one processor is further configured to transmit, from the intended receiver device to a transmitter device that transmitted the signal, the EVM indications when it is determined that the EVM indications is above the threshold.

In an additional aspect of the disclosure, an apparatus configured for providing radio frequency (RF) impairments indications is provided. The apparatus includes means for estimating, by an intended receiver device for a signal, error vector magnitude (EVM) indications for the signal and means for determining, by the intended receiver device, if the EVM indications is above a threshold. The apparatus further includes means for transmitting, by the intended receiver device to a transmitter device that transmitted the signal, the EVM indications when it is determined that the EVM indications is above the threshold.

In an additional aspect of the disclosure, a non-transitory computer-readable medium having program code recorded thereon for providing radio frequency (RF) impairments indications is provided. The program code includes code to estimate, at an intended receiver device for a signal, error vector magnitude (EVM) indications for the signal and to determine, at the intended receiver device, if the EVM indications is above a threshold. The program code further includes code to transmit, from the intended receiver device to a transmitter device that transmitted the signal, the EVM indications when it is determined that the EVM indications is above the threshold.

In one aspect of the disclosure, a method for wireless communication impairment correction is provided. The method includes receiving, by a transmitter device, error vector magnitude (EVM) indications from an intended receiver device and performing, by the transmitter device, non-linear correction of a transmit signal for the intended receiver device based at least in part on the EVM indications received from the intended receiver device.

In an additional aspect of the disclosure, an apparatus configured for wireless communication impairment correction is provided. The apparatus includes at least one processor, and a memory coupled to the processor. The at least one processor is configured to receive, at a transmitter device, error vector magnitude (EVM) indications from an intended receiver device and to perform, at the transmitter device, non-linear correction of a transmit signal for the intended receiver device based at least in part on the EVM indications received from the intended receiver device.

In an additional aspect of the disclosure, an apparatus configured for wireless communication impairment correction is provided. The apparatus includes means for receiving, by a transmitter device, error vector magnitude (EVM) indications from an intended receiver device and means for performing, by the transmitter device, non-linear correction of a transmit signal for the intended receiver device based at least in part on the EVM indications received from the intended receiver device.

In an additional aspect of the disclosure, a non-transitory computer-readable medium having program code recorded thereon for wireless communication impairment correction is provided. The program code includes code to receive, at a transmitter device, error vector magnitude (EVM) indications from an intended receiver device and code to perform, at the transmitter device, non-linear correction of a transmit signal for the intended receiver device based at least in part on the EVM indications received from the intended receiver device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
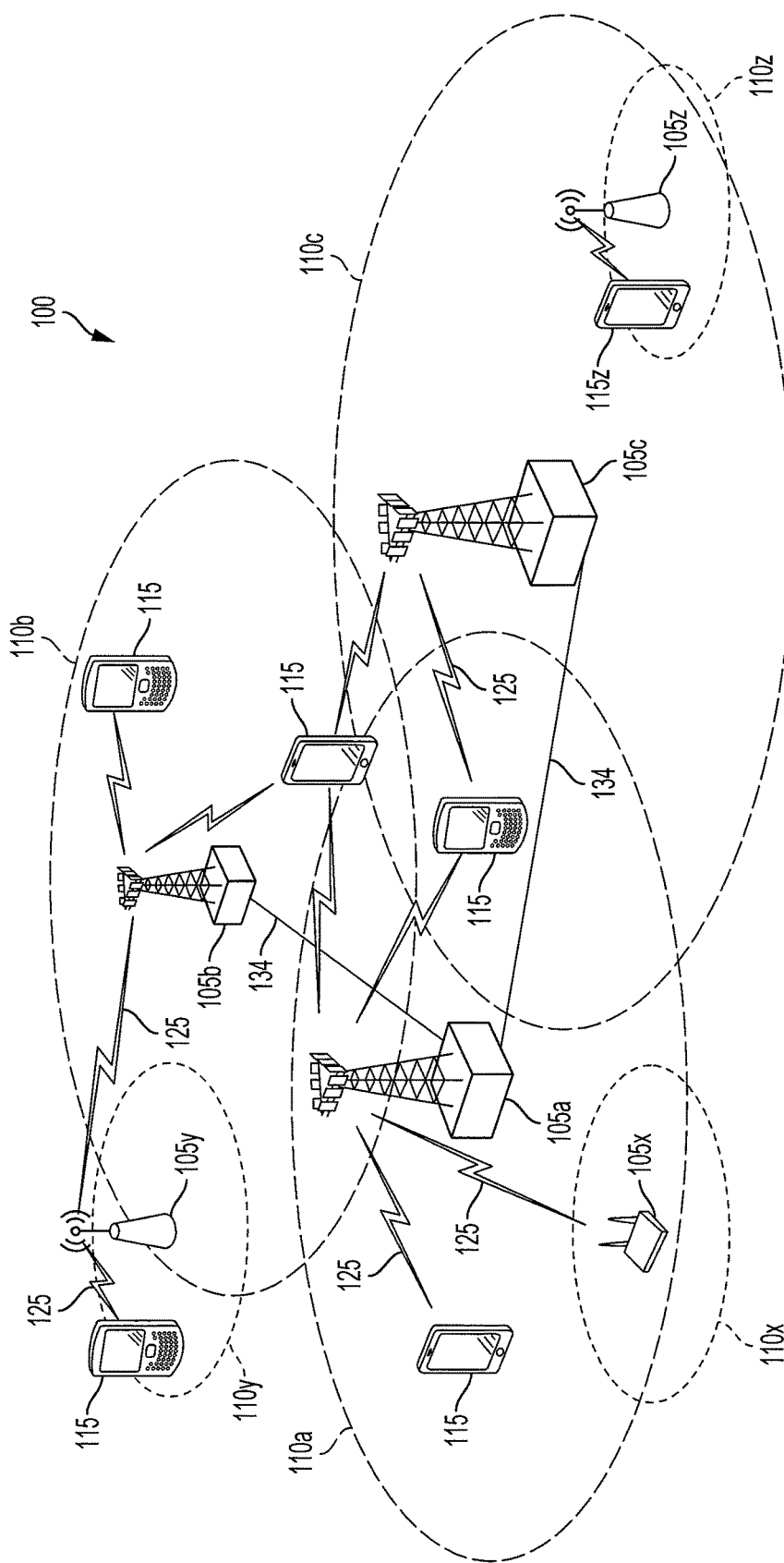
FIG. 1 is a block diagram illustrating details of a wireless communication system in which some embodiments may be implemented.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may, for example, implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example, implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Although backhaul communication 134 is illustrated as wired backhaul communications that may occur between eNBs, it should be appreciated that backhaul communications may additionally or alternatively be provided by wireless communications.

Figure 2:
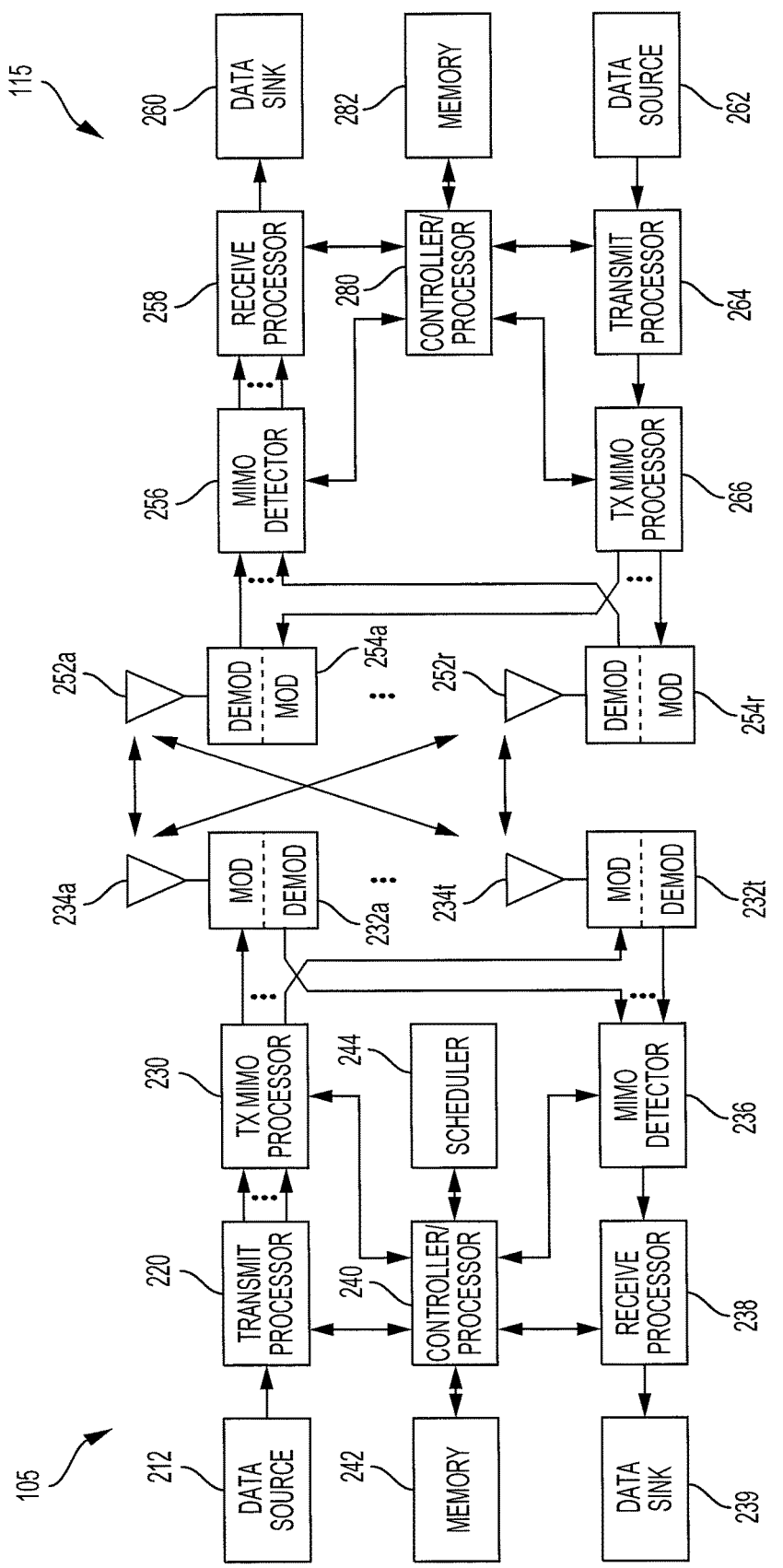
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 and/or the controllers/processor 280 and/or other processors and modules at the UE 115 may perform or direct the execution of the functional blocks illustrated in FIG. 7, and/or other processes for the techniques described herein. The memories 242 and 282 may store data and program codes for the eNB 105 and the UE 115, respectively. A scheduler 244 may schedule UEs for data transmission on the downlink and/or uplink.

As previously mentioned, RF links suffer from linear and non-linear distortions. This may include, linear distortions (e.g., liner time invariant (LTI) impairments due to the propagation channel) and non-linear distortions including amplitude modulation to amplitude modulation (AM-AM) and amplitude modulation to phase modulation (AM-PM) (e.g., non-linear distortions due to power amplifiers used in the transmitter). Additionally or alternatively, this may include Volterra coefficients (e.g., non-linearities associated with the "memory" effect of devices such as capacitors and inductors and/or as may be thermal based or otherwise introduced into the signals). As illustrated, RF links 301 (e.g., downlink) and 302 (e.g., uplink) between wireless device 305 (e.g., as may correspond to any of eNBs 105 or UEs 115 of wireless network 100 in FIG. 1) and wireless device 315 (e.g., as may correspond to any of UEs 115 or eNBs 105 of wireless network 100 in FIG. 1) shown in FIG. 3A may suffer from linear and non-linear distortions.

Figure 4:
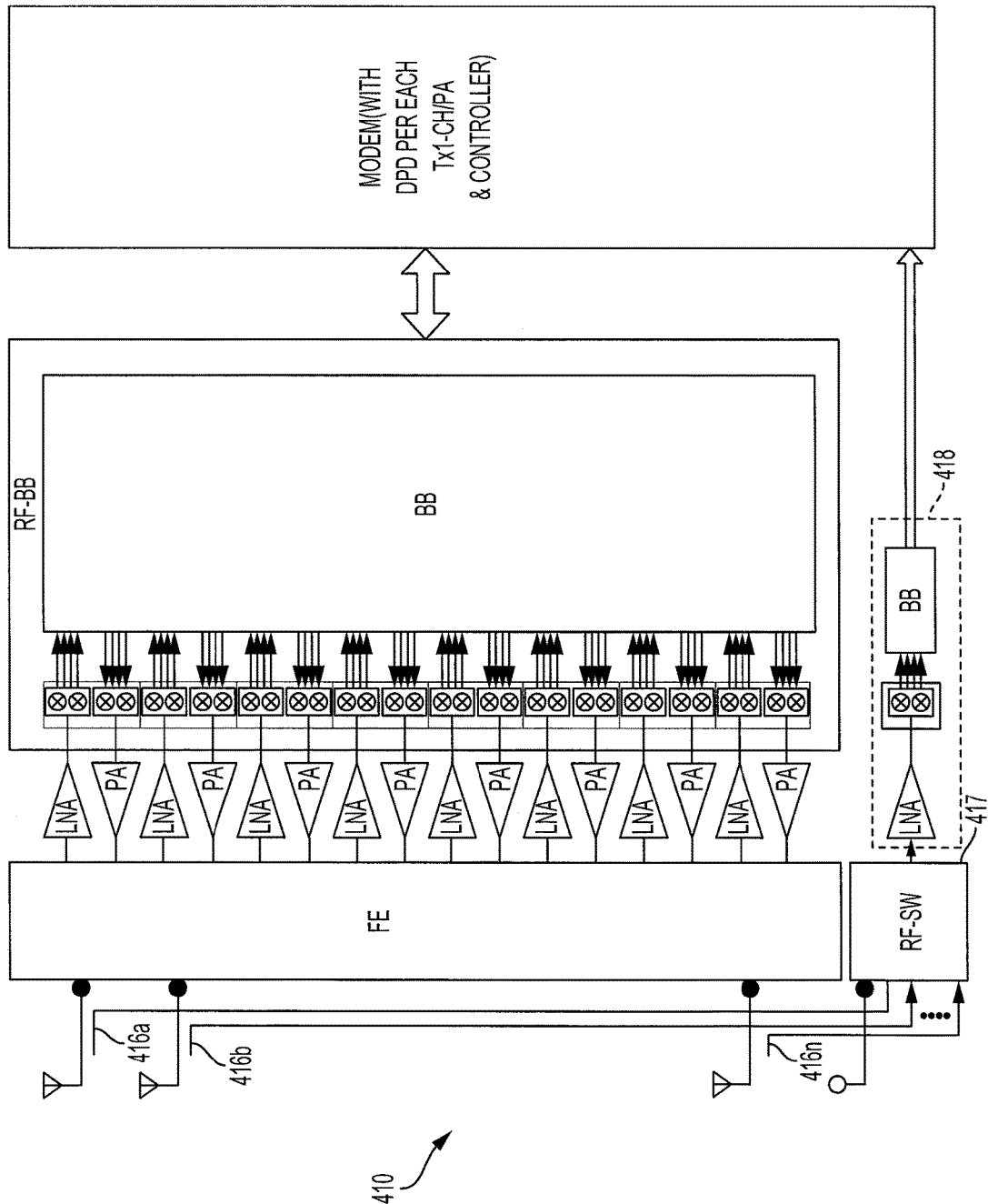
FIG. 4 is a block diagram of a transmitter device implementation of a feedback receiver.

As shown in FIG. 4, feedback receiver (FBRx) 418 may be used in transmitter device 410 (e.g., an eNBs or UE operating as a transmitter) to acquire information regarding impairments. Couplers 416a-416n and RF switch 417 of FIG. 4 are used to accommodate the different transmitter device transmission paths (e.g., the multiple power amplifiers (PAs) feeding the multiple antennas of the MIMO antenna system). This implementation estimates the non-linearities introduced by each transmitter path of the multiple output transmitters (i.e., multiple UL transmitters or multiple DL transmitters) standalone. Moreover, FBRx 418 and its associated circuitry introduces complexity with respect to the solution and neither provides information regarding the overall antenna array nor provides information with respect to the propagation channel. If RF impairment information were to be estimated with respect to multiple transmitter device transmission paths in parallel, instead of individually (e.g., using RF switch 417), a FBRx (e.g., n times FBRx 418) would need to be utilized with respect to each transmitter device transmission path. Such a configuration would result in increased complexity and power consumption and would still fail to provide information with respect to the propagation channel or the antenna array.

According to aspects of the disclosure, RF impairment information is estimated or otherwise determined by a receiver device (e.g., wireless device 305 of FIG. 3A operating as an intended receiver with respect to uplink 302 or wireless device 315 operating as an intended receiver with respect to downlink 301) and is acquired over the air by a transmitter device (e.g., wireless device 315 operating as the transmitter with respect to uplink 302 or wireless device 305 operating as the transmitter with respect to downlink 301) in a wireless communication system. In operation according to some aspects of the disclosure, the transmitter device acquiring the RF impairment information may utilize the information in various ways, such as to model the impairments (e.g., non-linear and/or linear impairments), to implement impairments correction, etc.

In operation of an implementation of an RF impairment information acquisition configuration according to aspects of the disclosure, various information indicative of the RF impairments for a link may be estimated at the output of the wireless channel at a wireless device. For example, wireless device 315 receiving a downlink transmission via RF link 301 or wireless device 305 receiving an uplink transmission via RF link 302 may estimate the RF impairments for a link according to embodiments. The various information indicative of the RF impairments may, for example, comprise EVM indications, AM-AM indications, AM-PM indications, Volterra coefficient indications, indications regarding adjacent channel spectral regrowth due to amplifier nonlinearity (referred to herein as adjacent channel leakage ratio (ACLR) indications), etc. The wireless device may provide the RF impairments information, or RF impairments parameters associated therewith, (collectively referred to herein as RF impairment indications) to a corresponding wireless device. For example, wireless device 315 may provide feedback of RF impairments information in an uplink transmission to wireless device 305 via RF link 302 or wireless device 305 may provide feedback of RF impairments information in a downlink transmission to wireless device 315 via RF link 301.

Embodiments of the invention are discussed here in a variety of arrangements. Examples are described below with reference to wireless device 305 operating as a transmitter device and wireless device 315 operating as a receiver device with respect to a communication link for which RF impairment information is acquired by the transmitter device. It should be appreciated, however, that either or both wireless devices may be adapted for RF impairments determination and feedback when operable as a receiver device and/or RF impairments acquisition when operable as a transmitter device.

To facilitate acquisition of RF impairment indications by the transmitter device, wireless device 315 (operating as the receiver device in the example) includes RF impairments feedback circuit 350 operable in accordance with concepts of the present disclosure. RF impairments feedback circuit 350 may, for example, operate to determine RF impairments information at the receiver device and to provide RF impairments information to the corresponding transmitter device. RF impairments feedback circuit 350 may, for example, comprise processor-executable code operable with respect to a processor (e.g., controller/processor 280 of FIG. 2) of wireless device 315 to provide functions (e.g., implemented as the functional blocks of RF impairments estimation circuit 351, RF impairments information feedback generator circuit 352 of the illustrated configuration, etc.) as described herein. RF impairments feedback circuit 350 may additionally or alternatively include one or more database, lookup table, etc., (e.g., implemented as RF impairment database 353, etc.) as may be stored by a memory (e.g., memory 282 of FIG. 2) of wireless device 315 for use with one or more function of RF impairments feedback circuit 350.

Correspondingly, wireless device 305 (operating as the transmitter device in the example) includes RF impairments acquisition circuit 360 operable in accordance with concepts of the present disclosure. RF impairments acquisition circuit 360 operates to acquire RF impairments information fed back from wireless device 315 by RF impairments feedback circuit 350. Additionally, RF impairments acquisition circuit 360 may operate to facilitate generation of RF impairments information by RF impairments feedback circuit 350. RF impairments acquisition circuit 360 may, for example, comprise processor-executable code operable with respect to a processor (e.g., controller/processor 240 of FIG. 2) of wireless device 305 to provide functions (e.g., implemented as the functional blocks of RF impairments information extraction circuit 361, reference signal generation circuit 362, etc.) as described herein. RF impairments acquisition circuit 360 may additionally or alternatively include one or more database, lookup table, etc., (e.g., implemented as RF impairment database 363, etc.) as may be stored by a memory (e.g., memory 242 of FIG. 2) of wireless device 305 for use with one or more function of RF impairment acquisition circuit 360.

Wireless device 315 operating in accordance with aspects of the present disclosure receives signals as transmitted by wireless device 305 and propagated through channel propagation channel 330 at antennas 316a-316m. The signals may, for example, comprise symbols provided to transmitter circuitry of wireless device 305 that are baseband processed (e.g., provided precoding), frequency converted to RF (e.g., by mixers), amplified for transmission (e.g., by power amplifiers), and processed by transmitter backend circuitry (e.g., filtered, diplexed, etc.), and radiated by antennas 306a-306n. The signals received by antennas 316a-316m may be provided to receiver circuitry of wireless device 315 and processed by receiver frontend circuitry (e.g., diplexed, filtered, etc.), amplified (e.g., by low noise amplifiers), frequency converted to baseband (e.g., by mixers), and baseband signal processed (e.g., provided decoding) to recover symbols from the signals. The signals as received by wireless device 315, however, suffer from linear and non-linear distortions, such as linear distortions due to the propagation channel (e.g., LTI impairments of propagation channel 330) and non-linear distortions (e.g., amplitude and/or phase impairments of power amplifiers of wireless device 305).

Accordingly, RF impairments estimation circuit 351 operates in accordance with aspects of the present disclosure to analyze the received signals to estimate, compute, or otherwise determine the RF impairments present with respect to the signals received from wireless device 305 through propagation channel 330. For example, RF impairments estimation circuit 351 may individually analyze the signal received by each of antennas 316a-316m. Additionally or alternatively, RF impairments estimation circuit 351 may analyze one or more signals as combined from signals provided by combinations of antennas 316a-316m (e.g., signals beamformed from the signals received by various combinations of antennas 316a-316m). It should be appreciated that the RF impairments information determined according to aspects of the disclosure includes not only linear and non-linear impairments of the communication channel, but also include indications of the operation of the overall antenna array (e.g., the antenna array comprised of antennas 306a-306n).

The RF impairments information determined by RF impairments estimation circuit 351 may, for example, comprise AM-AM indications, AM-PM indications, Volterra coefficient indications, EVM indications, etc. Further, RF impairments estimation circuit 351, or other circuitry of wireless device 315, may operate to determine additional information regarding the signal transmitted by wireless device 305, such as ACLR indications, channel state indications, etc.

Figure 5A:
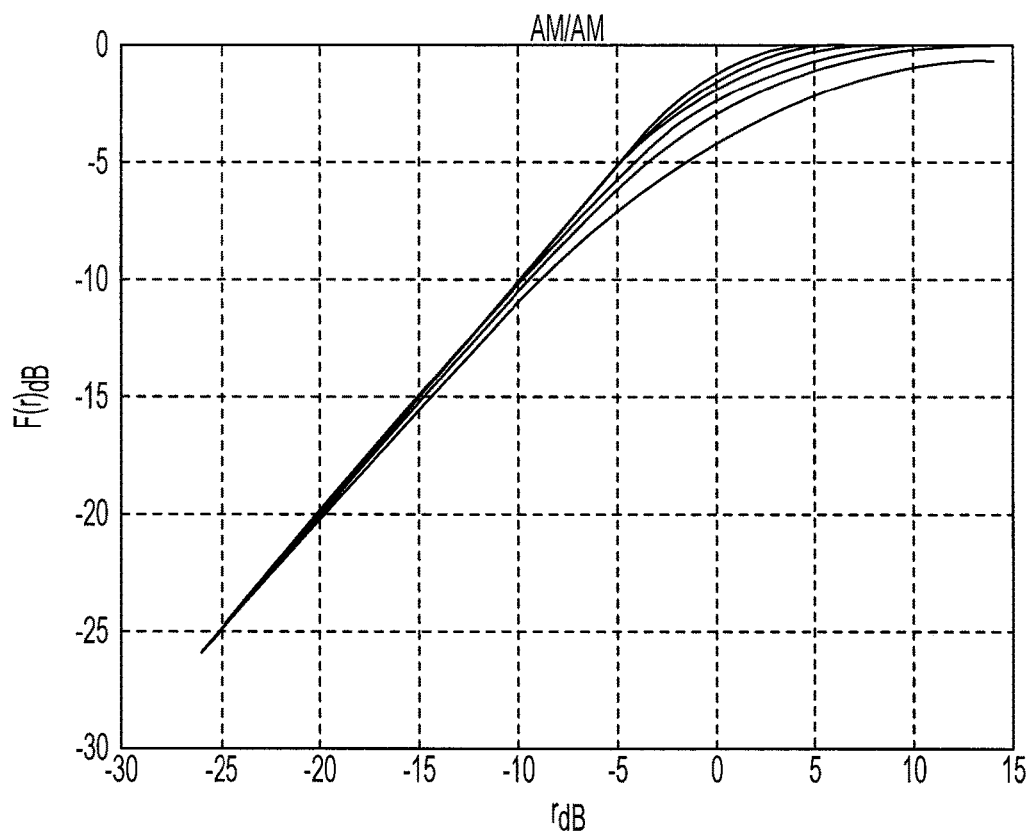
FIGS. 5A and 5B illustrate curves that describe the non-linearity behavior of the transmitter as may be estimated by a wireless device adapted according to aspects of the present disclosure.
Figure 5B:
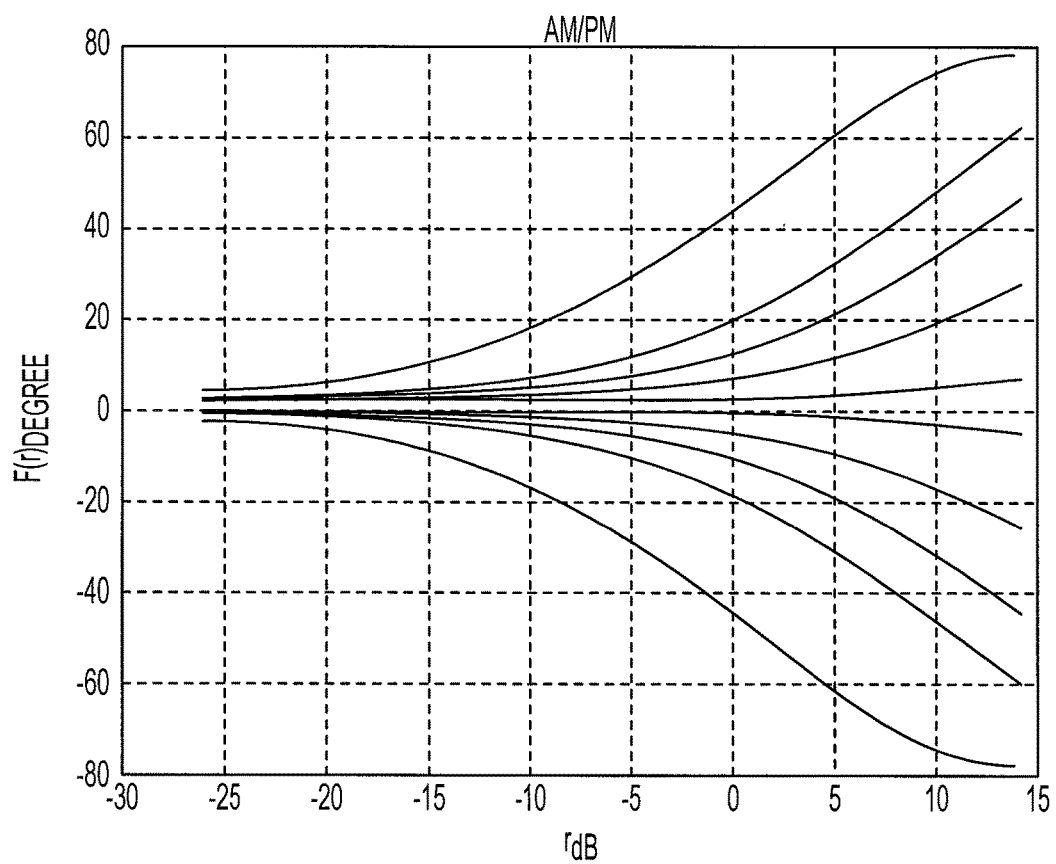

FIGS. 5A and 5B illustrate AM-AM (FIG. 5A) and AM-PM (FIG. 5B) curves that describe the non-linearity behavior of the transmitter as may be estimated by RF impairments estimation circuit 351. In operation of some implementations of a RF impairment information acquisition system according to aspects of the present disclosure, RF impairments curves such as those of FIGS. 5A and 5B may be estimated in the receiver using a dedicated reference signal specially defined for this task (e.g., particular preamble bits included in the received signal). For example, reference signal generator 362 of the transmitter may operate to transmit such a dedicated reference signal. This can include, for example, RF impairments estimation circuit 351 of the receiver analyzes the received signal for generation of one or more RF impairments curves.

In operation according to some implementations, RF impairments estimation circuit 351 may determine if one or more impairment indication estimation (e.g., EVM, AM-AM, AM-PM, Volterra coefficients, etc.) may not be made (or may not accurately or reliably be made) using the reference signal (e.g., preamble bits in the received signal). If one or more impairment indication estimation cannot be made (or cannot be made accurately or reliably), wireless device 315 may signal wireless device 305 to initiate operation for facilitating estimation of the impairment indications by the receiver wireless device. For example, the signaling may provide a request for wireless device 305 to increase the transmit power level with respect to reference signal used by the wireless device 315 to estimate the one or more impairment indications.

Figure 3A:
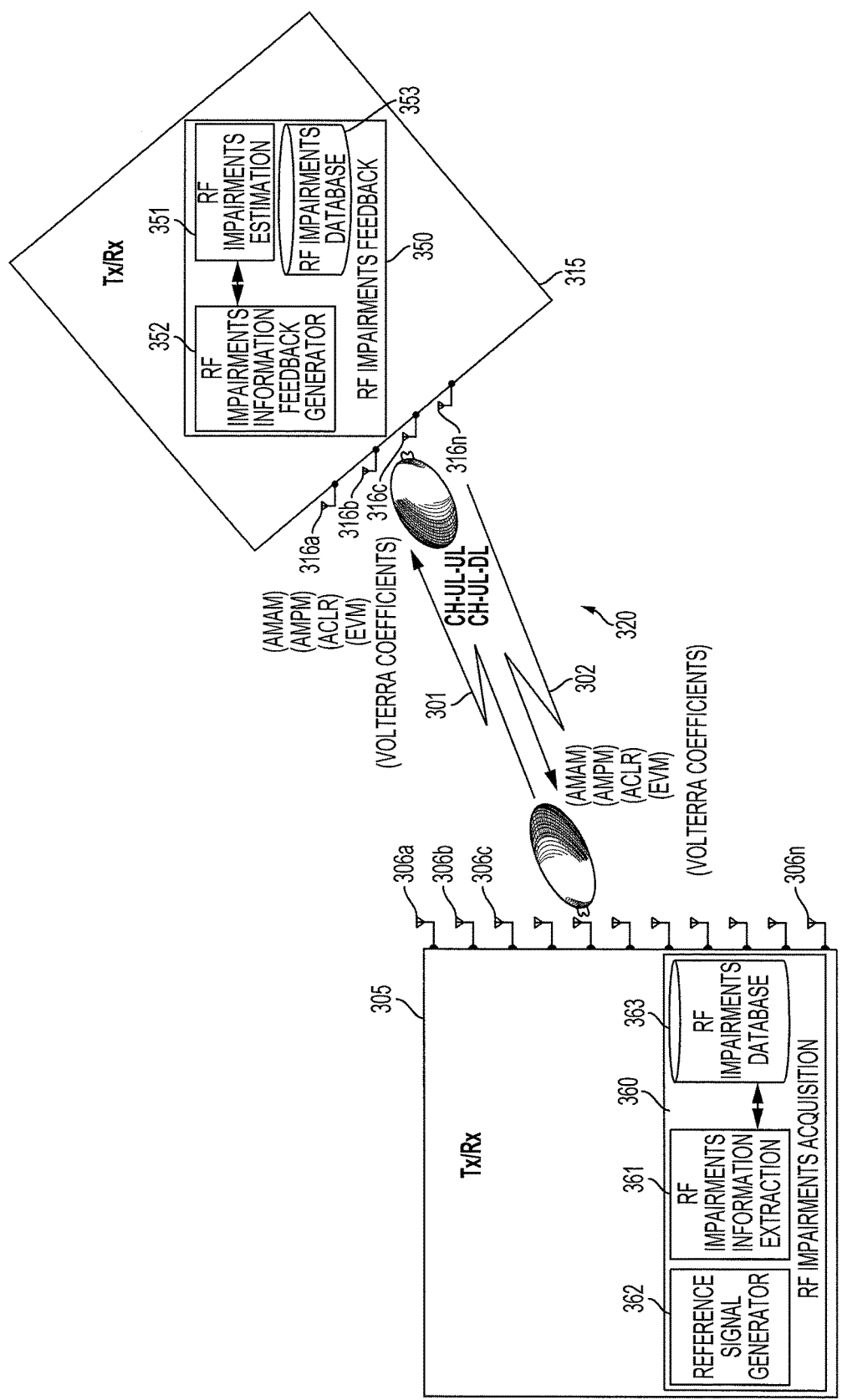
FIG. 3A is a block diagram showing wireless devices according to aspects of the present disclosure illustrating RF links between wireless devices and associated feedback.

Having determined RF impairment indications, RF impairments information feedback generator circuit 352 illustrated in FIG. 3A operates to provide the RF impairments information, or information associated therewith, to wireless device 305 (e.g., via RF link 302). For example, RF impairments information feedback generator circuit 352 may provide RF impairments data to a baseband processor of wireless device 315 for inclusion in one or more control channels, data packets, preambles, etc. for RF transmission processing and transmission by circuitry of wireless device 315. The RF impairments data may be accompanied by other information regarding the signal transmitted by wireless device 305 (e.g., ACLR information, channel state information, etc.) in some embodiments. The RF impairments indication may have been determined by estimating AM-AM and AM-PM curves corresponding to curves of FIGS. 5A and 5B, Volterra coefficient indications (e.g., by estimating a Volterra series for estimated non-linearities resulting from the effects of the aforementioned device memory), and/or EVM indications for the received signals.

The RF impairments information determined by RF impairments estimation circuit 351 (e.g., the aforementioned AM-AM curve, AM-PM curve, Volterra coefficients, and/or EVM indications) may itself be transmitted from wireless device 315 to wireless device 305. However, operation in accordance with aspects of the present disclosure provides for transmission of information from which the RF impairments information determined by RF impairments estimation circuit 351 may be determined by logic of wireless device 305 (e.g., RF impairments information extraction circuit 361). For example, RF impairments parameters, indexes, keys, identifiers, and/or other information from which the RF impairment information determined by RF impairments estimation circuit 351 may be determined may be transmitted from wireless device 315 to wireless device 305.

RF impairments information feedback generator circuit 352 may operate to utilize information stored within RF impairment database 353 with the RF impairments information determined by RF impairments estimation circuit 351 to obtain RF impairments parameters, indexes, keys, identifiers, and/or other information from which the RF impairment information determined by RF impairments estimation circuit 351 may be determined. For example, RF impairment database 353 may store a codebook or lookup table that contains different modelings of the AM-AM and AM-PM impairments (e.g., the aforementioned AM-AM and/or AM-PM curves of FIGS. 5A and 5B) and/or Volterra coefficient impairments (e.g., one or more Volterra series to which estimated non-linearities are compared). Such a database of curves and/or tables may, for example, be pre-defined in a RF impairments feedback protocol, whereby when the receiver has estimated a specific RF impairments curve for feedback to the transmitter, only a corresponding index from the codebook is fed back. Using this index and a corresponding codebook or lookup table (e.g., stored in RF impairments database 363), RF impairments information extraction circuit 361 may identify the particular RF impairments curve for determining the RF impairments information applicable to the signals received by the receiver.

It should be appreciated that an instance of wireless device 315 providing feedback of RF impairments information and/or other information in accordance with the concepts herein may be an intended receiver of one or more intended receivers for the signal for which such information is determined and fed back to the corresponding transmitting device. Additionally, unintended receivers for the signal may provide feedback of information with respect to their reception of the signal (e.g., as interference). For example, an instance of wireless device 315 providing feedback of information herein (e.g., ACLR) may be an unintended receiver of one or more unintended receivers (e.g., wireless devices operating on a different channel, wireless devices operating in a neighboring cell, etc.) that nevertheless provides feedback of information herein to facilitate RF impairment corrective estimations or other operations by the transmitter device. For example, EVM indications, AM-AM indications, AM-PM indications, and/or Volterra coefficient indications, may be estimated at the output of the wireless channel at a desired wireless device (i.e., intended receiver), whereas ACLR indications may be estimated at the input to the desired wireless device and/or the input to the non-desired wireless device (i.e., unintended receiver). Thus, transmitting wireless device 305 may know the overall state of the propagation channel in addition to the non linearities that are to be address (e.g., non-linearities of the PAs).

Wireless device 305 operating in accordance with aspects of the present disclosure receives signals including the RF impairments parameters transmitted by wireless device 315 as propagated through channel propagation channel 330 at antennas 306a-306n. The signals received by antennas 306a-306n may be processed by receiver frontend circuitry (e.g., diplexed, filtered, etc.), provided amplification (e.g., by low noise amplifiers), frequency converted to baseband (e.g., by mixers), and baseband signal processed (e.g., by baseband decoding) to recover symbols providing the RF impairment data from the signals. Where the RF impairments information determined by RF impairments estimation circuit 351 is itself transmitted from wireless device 315 to wireless device 305 (e.g., the aforementioned AM-AM curve, AM-PM curve, Volterra coefficients, and/or EVM), the RF impairment data may be extracted by RF impairments information extraction circuit 361 directly from the foregoing data recovered from the received feedback signal. However, where information from which the RF impairments information may be determined is transmitted from wireless device 315 to wireless device 315 (e.g., the aforementioned RF impairments parameters, indexes, keys, identifiers, etc.), the RF impairment data may be further processed by RF impairments information extraction circuit 361 to extract the RF impairments information. For example, logic of RF impairments information extraction circuit 361 may utilize information such as RF impairments parameters, indexes, keys, identifiers, etc. extracted from the received feedback signal to access a codebook or lookup table stored by RF impairments database 363 that contains different modelings of the AM-AM and AM-PM impairments (e.g., the aforementioned AM-AM and/or AM-PM curves of FIGS. 5A and 5B) and/or Volterra coefficient indications (e.g., the aforementioned Volterra series table). Accordingly, an appropriate modeling of the RF impairment information may be accessed to extract the RF impairment information by RF impairments information extraction circuit 361.

Various non-linearity modeling may be utilized in a RF impairment information acquisition implementation according to the concepts of the present disclosure. For example, solid state power amplifier (SSPA) models (also referred to as Rapp models), traveling wave tube (TWT) models, polynomic models, Volterra models (e.g., to model high power amplifiers (HPAs with memory effects), and/or combinations thereof may be utilized according to some aspects of the disclosure. Further detail regarding the use of modeling as may be employed according to implementations of a RF impairment information acquisition system is discussed in L. C. Nunes, P. M. Cabral and J. C. Pedro, "A Physical Model of Power Amplifiers AM/AM and AM/PM Distortions and Their Internal Relationship," IEEE MIT-S Int. Microw. Symp. Dig., Seattle, Wash., USA, June 2013, the disclosure of which is hereby incorporated herein by reference.

Wireless device 305 may utilize the RF impairments information in various ways, such as to model the impairments (e.g., non-linear and/or linear impairments), to implement impairments correction, etc. For example, wireless device may extract the RF impairment information and/or other information regarding the signal transmitted by wireless device 305 from the feedback signal by operation of RF impairments information extraction circuit 361. This RF impairments information may include information acquired from one or more intended receivers as well as one or more unintended receivers.

Figure 6:
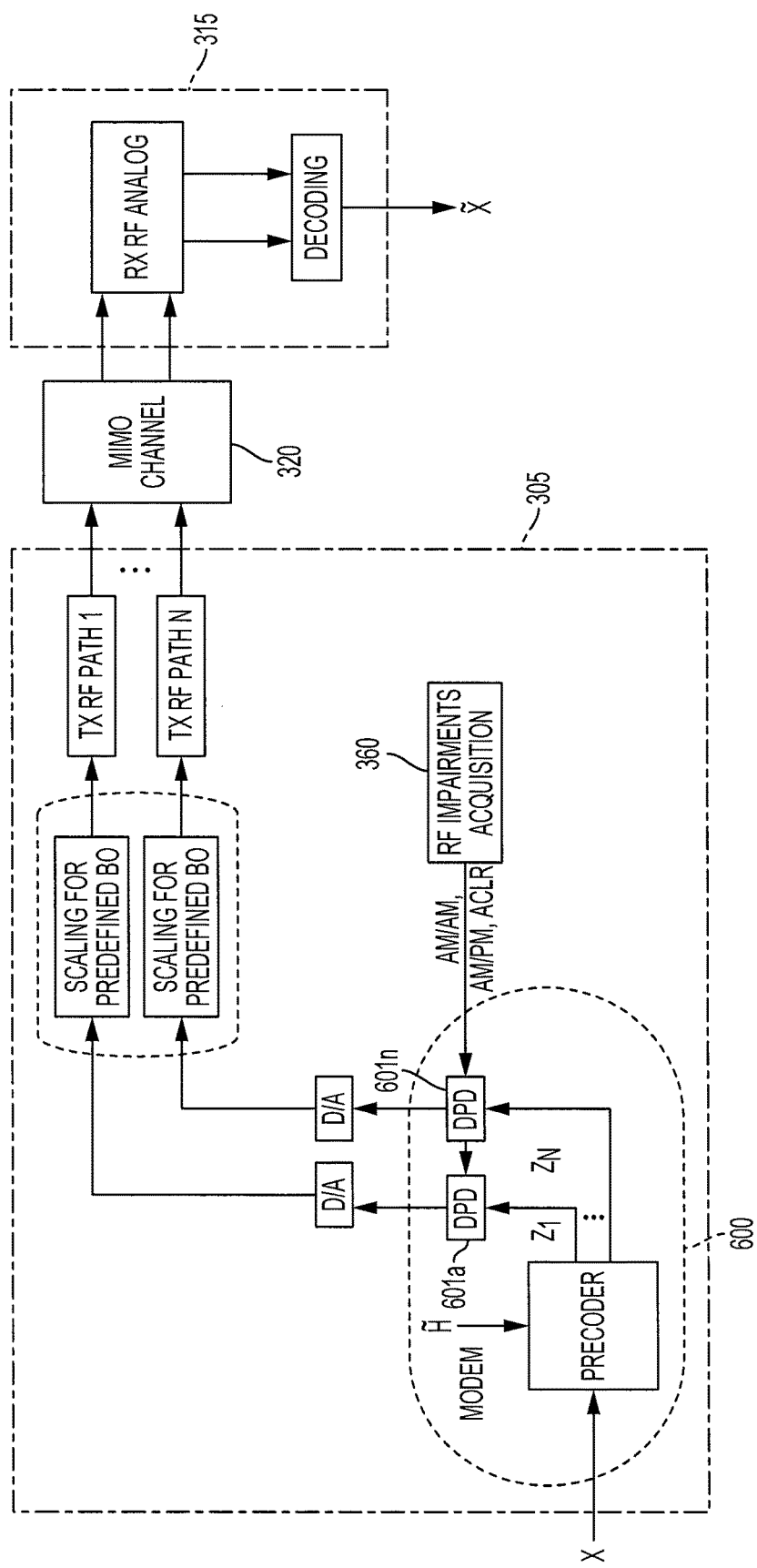
FIG. 6 is a block diagram showing a wireless device adapted to extract and utilize RF impairments information in accordance with aspects of the present disclosure.

The implementation of wireless device 305 shown in FIG. 6 illustrates the use of such information according to some aspects of the present disclosure. For example, in the configuration of FIG. 6, RF impairments acquisition circuit 360 provides the RF impairment information to digital predistorters (DPDs) 601a-601n of modem 600. Accordingly, the RF impairment information, such as may comprise the aforementioned modelings of AM-AM and/or AM-PM impairments and/or Volterra coefficient impairments, may be utilized by DPDs 601a-601n to provide predistortion of the signals for each transmit path of wireless device to compensate for linear and non-linear impairments of the communication channel, as well as to provide compensation for the overall antenna array. It should be appreciated that, although the exemplary configuration shown in FIG. 6 shows DPDs utilizing RF impairment information acquired according to concepts herein, various other circuits, devices, functional blocks, etc. may additionally or alternatively utilize RF impairment information and other information acquired as described herein. For example, RF impairments correction may be provided using beamforming precoding, whereby precoders of wireless device 305 may utilize RF impairment information and other information acquired as described herein in providing precoding of transmit signals.

It should be appreciated that an instance of wireless device 315 providing feedback of RF impairments information and/or other information in accordance with the concepts herein may be an intended receiver of one or more intended receivers for the signal for which such information is determined and fed back to the corresponding transmitting device. Additionally, unintended receivers for the signal may provide feedback of information with respect to their reception of the signal (e.g., as interference). For example, an instance of wireless device 315 providing feedback of information herein (e.g., ACLR) may be an unintended receiver of one or more unintended receivers (e.g., wireless devices operating on a different channel, wireless devices operating in a neighboring cell, etc.) that nevertheless provides feedback of information herein to facilitate RF impairment corrective estimations or other operations by the transmitter device. For example, EVM indications, AM-AM indications, and/or AM-PM indications, Volterra coefficient indications, may be estimated at the output of the wireless channel at a desired wireless device (i.e., intended receiver), whereas ACLR indications may be estimated at the input to the desired wireless device and/or the input to the non-desired wireless device (i.e., unintended receiver). Thus, transmitting wireless device 305 may know the overall state of the propagation channel in addition to the non linearities that are to be address (e.g., non-linearities of the PAs).

Figure 3B:
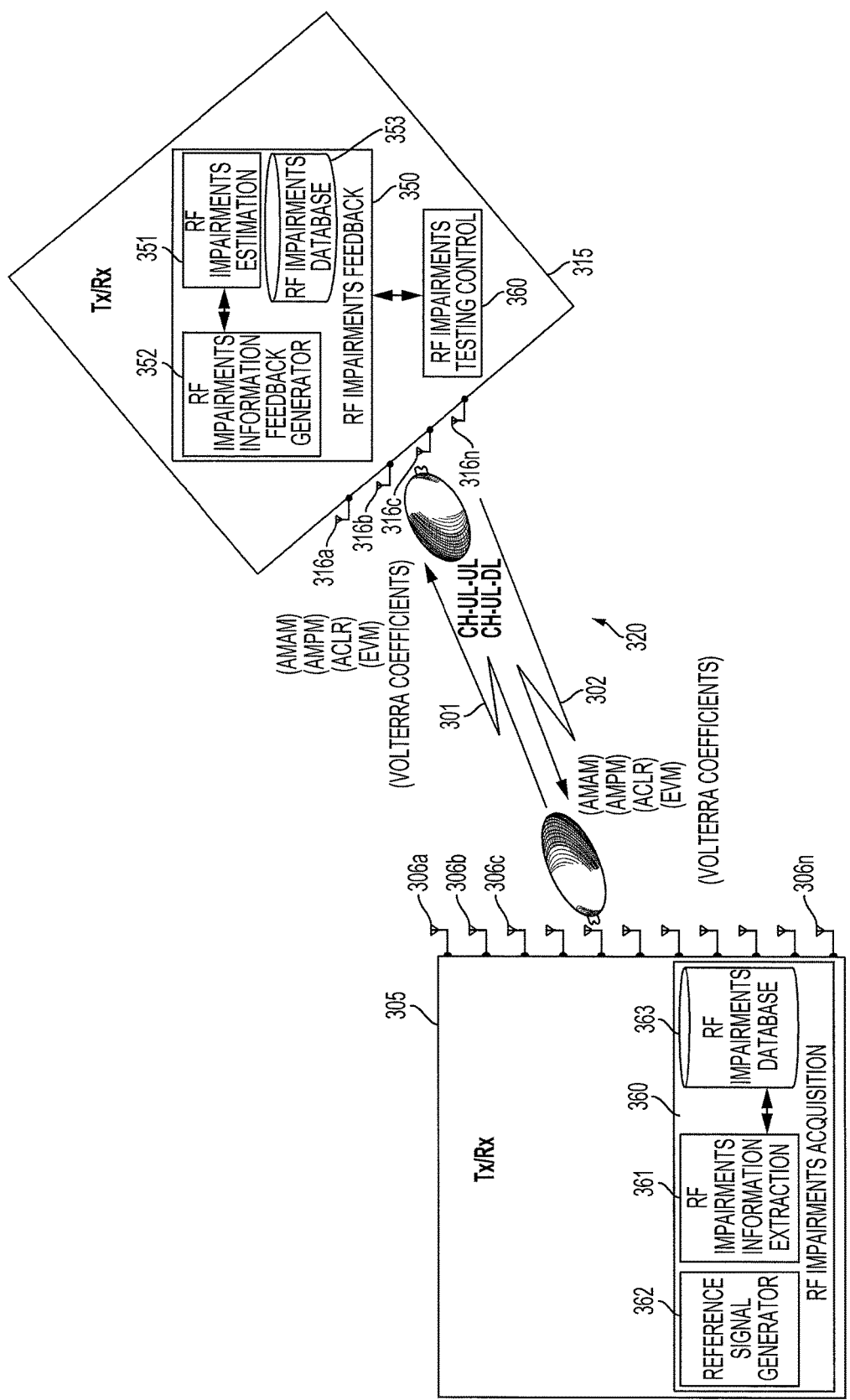
FIG. 3B is a block diagram showing a RF impairments information acquisition configuration including a test equipment wireless device adapted according to aspects of the present disclosure.

Examples have been discussed herein with reference to the wireless transmitter and receiver devices. These components can be adapted to provide for RF impairment information acquisition comprising UEs and/or base stations (e.g., eNBs), such as may correspond to any of UEs 115 or eNBs 105 of wireless network 100 in FIG. 1. It should be appreciated, however, that wireless devices adapted according to the concepts herein are not limited to the discussed configurations of wireless devices. Indeed, the implementation illustrated in FIG. 3B provides a RF impairments information acquisition configuration including a test equipment (TE) wireless device adapted according to aspects of the present disclosure. In particular TE 315' is shown as the receiver device providing feedback of RF impairments information in the exemplary implementation of FIG. 3B.

In the implementation illustrated in FIG. 3B, wireless device 305 (e.g., a wireless device under test) is configured to operate as a transmitter device (e.g., as may be a UE, eNB, etc.) and TE 315' is configured to operate as a receiver device with respect to a communication link for which RF impairment information is acquired by the transmitter device, similar to wireless devices 305 and 315 of FIG. 3A discussed above. However, the implementation of FIG. 3B provides a testing and calibration mode wherein the transmitter device (wireless device 305) works with TE 315' under test conditions, such as for initially calibrating wireless device 305, for providing baseline RF impairment information, etc. For example, wireless device 305 may comprise a UE under production wherein TE 315' is utilized to calibrate the UE for later operation in the field. TE 315' may operate to provide feedback of RF impairments information as an intended receiver, an unintended receiver, or both for facilitating RF impairment estimation, testing, calibration, and/or correction with respect to a wireless device under test (e.g., wireless device 305).

In operation, TE 315' may not only provide feedback of RF impairment information, but may provide control with respect to a device under test (e.g., wireless device 305) include RF impairments testing control 360 (e.g., processor-executable code operable with respect to a processor, such as controller/processor 280 of FIG. 2, of TE 315' to provide functions as described herein) to provide control of various aspects of operation of the wireless device under test, such as transmit power, beam forming, carrier selection, reference signal transmission, etc. For example, TE 315' may operate to estimate EVM indications, AM-AM indications, AM-PM indications, Volterra coefficient indications, ACLR indications, etc., with respect to selected operational conditions (e.g., as controlled by RF impairments testing control 315') at the wireless device under test, such as maximum transmit power, minimum transmit power, typical use case transmit power, narrow transmit beam, broad transmit beam, omni directional transmit beam, typical use case transmit beam, etc. Such control may facilitate more ideal operational conditions for testing, such as through the TE artificially forcing the UE to transmit at its upper transmit power levels for doing the DPD, in contrast to the situation in the field in which the UE is exposed to fading and performs power control. The test configuration control and RF impairment estimation provided by configurations of TEs herein may be very powerful in production of calibrated wireless devices, such as with respect to different beam patterns impedance/matching over the Sphere (e.g., patch antennas on top differ from dipoles in the perimeter, etc.) and the impact on the overall transmission non-linearity.

In accordance with some implementations, TE 315' comprises dedicated test equipment configured to support RF impairments correction according to concepts of the disclosure. Some configurations of TE 315' may, for example, emulate a particular type of wireless device (e.g., base station or UE) with modifications to the protocol to facilitate RF impairment estimation, testing, calibration, and/or correction as described herein. As a specific example, TE 315' may emulate a base station (e.g., eNB 105) with modifications in the protocol, such as to communicate control signals to the wireless device under test (e.g., wireless device 305) to force the device to operate at specific output power, transmission mode, modulation-and-coding scheme (MCS), etc., to estimate and send the wireless device under test AM-AM and AM-PM information or any other pre-defined characteristic of the non-linearity (e.g., Volterra coefficients), to provide a transition mode for determining feedback for per antenna or per array, and/or to send raw data captured by TE 315' to the wireless device under test to enable the wireless device under test to evaluate non-linearity characteristics.

Figure 7:
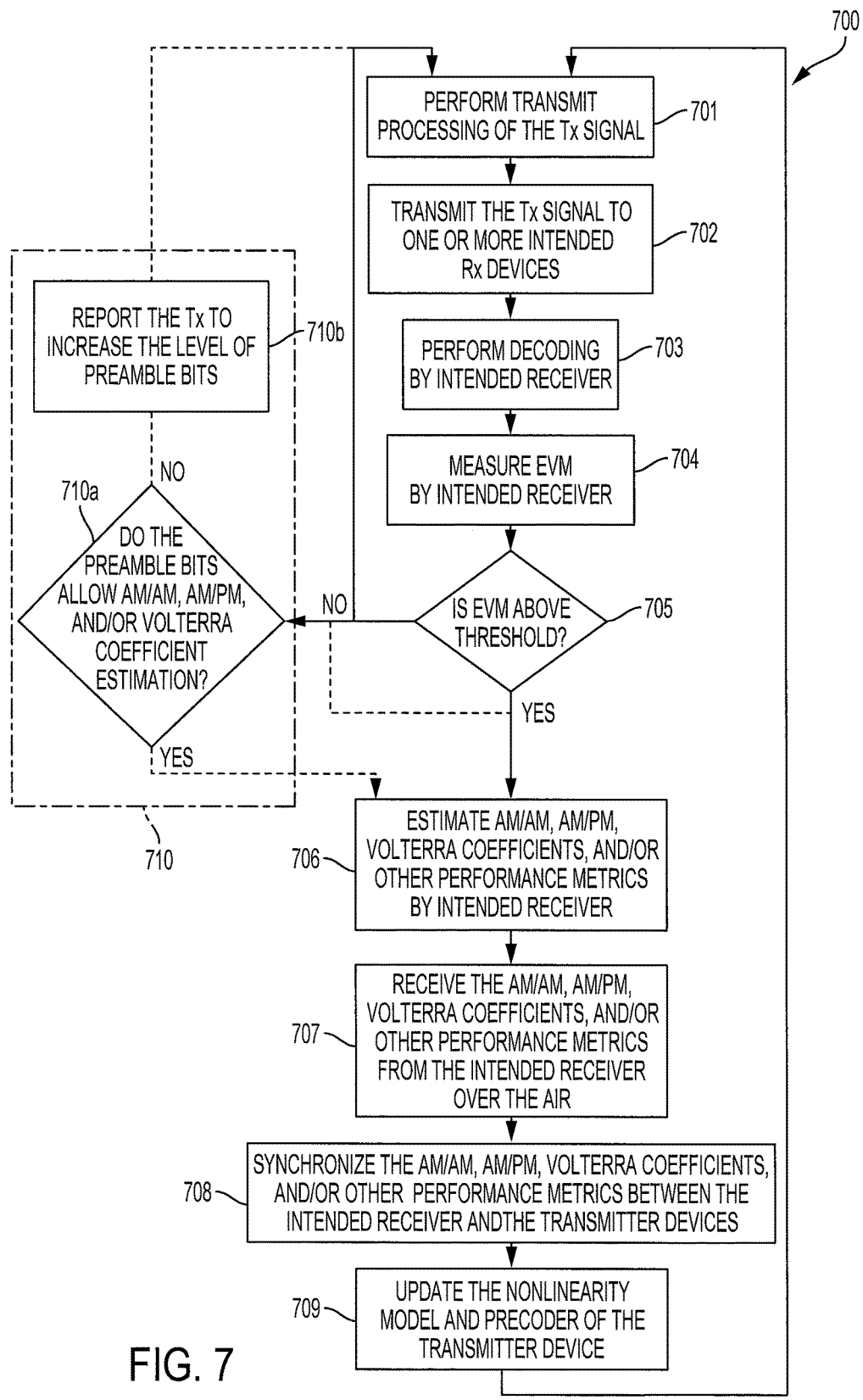
FIG. 7 is a block diagram showing an operational flow providing acquisition of RF impairment information in accordance with aspects of the present disclosure.

Flow 700 of FIG. 7 provides a flow diagram for methods providing RF impairments information acquisition in accordance with some embodiments of the technology discussed in this document. The functions of flow 700 may be implemented by various functional blocks illustrated in FIG. 2 of the wireless devices operable as a transmitter receiver pair. For example, controller/processors 240 and/or 280 of FIG. 2 may execute code operable to provide functions as illustrated in flow 700 of FIG. 7.

At block 701 of flow 700, the wireless device to transmit a signal (e.g., wireless device 305 in the above example) performs transmit processing of the transmit signal (e.g., predistortion, precoding, frequency conversion, amplification, etc.). Such transmit processing may initially be performed without the benefit of RF impairment information as may be acquired according to the concepts herein. For example, predistortion and/or precoding provided by the transmitting wireless device may be provided using default parameters, predetermined amplifier modeling, etc.

The signal is transmitted by the wireless device (e.g., wireless device 305) at block 702. Thereafter, the transmitted signal propagates through the propagation channel (e.g., propagation channel 320) and may be received by one or more intended and/or unintended wireless devices. In operation, one or more intended receivers for the signal (e.g., wireless device 315 in the above example) receives and decodes the signal at block 703. The signal as received by the one or more intended receivers is impaired to some extent by the transmission by the transmitting wireless device (e.g., non-linear distortion introduced by the transmit power amplifiers, effects of radiation by the antennas of the transmit array, etc.) and propagation through the propagation channel (e.g., liner time invariant distortion resulting from the propagation channel). Accordingly, the wireless device receiving the signal (e.g., wireless device 315) operates to estimate RF impairment information and/or other information regarding the signal (e.g., AM-AM, AM-PM, Volterra coefficients, and/or other performance metrics) for providing to the transmitting wireless device (e.g., wireless device 305) for use in providing impairments correction in accordance with aspects of the present disclosure.

It should be appreciated, however, that it may not be desirable or even possible for a receiving device to estimate and/or report such RF impairment information and/or other information regarding the signal in all situations. For example, where the EVM is acceptably low operation to correct RF impairments implemented by the transmitter device may be adequate and thus no estimation and/or reporting of RF impairment information and/or other information regarding the signal may be made by a receiver wireless device of some implementations. Accordingly, at blocks 704 and 705 of flow 700 shown in FIG. 7 provide functions for controlling the estimation and reporting of RF impairment information and/or other information regarding the signal based upon one or more criteria.

At block 704, EVM is estimated (e.g., through operation of RF impairments feedback circuit 350 as described above) with respect to the received by the intended receiver (e.g., wireless device 315). Thereafter, at block 705, a determination is made as to whether the estimated EVM is above a threshold. The threshold may be static, dynamic, or configured as desired or needed. The threshold similarly may be based on a number of parameters related to operations. For example, a predetermined level of EVM providing satisfactory communication (e.g., acceptable data throughput, acceptably low bit error rates (BER), etc.) and/or a level of EVM at which further optimization of impairments correction by the transmitter wireless device is not desired or impractical may be utilized to establish the EVM threshold utilized according to some implementations of an RF impairment information acquisition configuration according to aspects of the disclosure.

If it is determined at block 705 that the estimated EVM is not above the threshold (e.g., EVM with respect to the signal received by the intended receiver wireless device is acceptably low), processing according to flow 700 of the illustrated implementation returns to block 701 (e.g., for further operation to provide signal transmission to the receiver wireless device by the transmitter wireless device) without performing further estimation of RF impairment indications and/or other information regarding the signal. The EVM estimated by the intended receiver wireless device may be reported to the transmitter wireless device. However, in operation according to some implementations, further impairment correction (e.g., optimization by iterative impairment correction) is not implemented by the transmitter wireless device where the EVM for the signal as received by the intended receiver wireless device is acceptably low. Accordingly, some implementations may operate not to provide reporting of the estimated EVM when it is determined that the estimated EVM is not above the threshold.

If it is determined at block 705 that the estimated EVM is above the threshold (e.g., EVM with respect to the signal received by the intended receiver wireless device is unacceptably high), processing according to flow 700 of the illustrated implementation may proceed to perform further estimation of RF impairment information and/or other information regarding the signal. It should be appreciated, however, that the particular conditions present with respect to the transmission of the signal by the transmitter wireless device and the reception of the signal by the receiver wireless device may be such that estimation of some impairments indications and/or other information regarding the signal may be inaccurate or impractical. For example, in some signal conditions (e.g., low signal to noise ratio (SNR) conditions) it may not be possible or practical to estimate, or accurately and reliably estimate, some impairments indications, such as AM-AM, AM-PM, and/or Volterra coefficient indications. Accordingly, implementations of an RF impairment information acquisition configuration according to aspects of the disclosure may include the functions of optional block 710 shown in flow 700 for facilitating estimation of RF impairment indications and/or other information regarding the signal. For example, if it is determined at block 705 that the estimated EVM is above the threshold, prior to proceeding to block 706 for operation to estimate one or more RF impairment indications and/or other information regarding the signal as may be used in providing impairments correction according to concepts herein, processing according to flow 700 of some implementations may proceed to block 710a wherein a determination is made as to whether one or more impairment indication can accurately or adequately be estimated by the receiver wireless device (e.g., to determine if the particular communication conditions are such that AM-AM, AM-PM, and/or Volterra coefficient estimation may be inaccurate or impractical). As a specific example, a determination may be made regarding whether preamble bits in the received signal allow AM-AM, AM-PM, and/or Volterra coefficient estimation.

In accordance with the illustrated optional configuration, if it is determined at block 710a that one or more impairment indication may not be made (or may not accurately or reliably be made), processing according to the illustrated example proceeds to block 710b wherein the receiver wireless device (e.g., wireless device 315) undertakes to signal the transmitter wireless device (e.g., wireless device 305) with respect to the communication conditions. For example, the signaling to the transmitter device may be to initiate operation for facilitating estimation of the impairment indications by the receiver wireless device. As a specific example, the signaling may operate as a request for the transmitter wireless device to increase the transmit power level with respect to preamble bits used by the receiver wireless device to estimate AM-AM, AM-PM, and/or Volterra coefficient indications (e.g., to increase the SNR of preamble bits in the received signal for facilitating AM-AM, AM-PM, and/or Volterra coefficient estimation). Such an implementation may, for example, operate to increase the transmitter preamble bits power level at a specific time duration when the EVM is not good enough (relevant for specific systems) in order to facilitate taking the AM-AM, AM-PM, and/or Volterra coefficient estimations by the intended receiver. The receiver wireless device may thus be enabled to accurately and/or reliably estimate the one or more impairment indication (e.g., after a subsequent iteration of the functions of blocks 701-705 and/or 710a). If, however, it is determined at block 710a that the one or more impairment indication may be estimated, processing according to the illustrated example proceeds to block 706 wherein estimation of the impairment information and/or other information regarding the signal is made.

The wireless device receiving the signal (e.g., wireless device 315) operates to estimate RF impairment information and/or other information regarding the signal (e.g., AM-AM, AM-PM, Volterra coefficients, and/or other performance metrics) at block 706 (e.g., through operation of RF impairments feedback circuit 350 as described above). Also at block 706, some or all such estimated information, or information associated therewith (e.g., the aforementioned RF impairment indications such as may comprise RF impairments parameters, indexes, keys, identifiers, and/or other information from which the RF impairment information may be determined) is transmitted from the wireless device receiving the signal (e.g., wireless device 315) to the wireless device that transmitted the signal (e.g., wireless device 305). For example, the data being fed back to the transmitter wireless device may be included in one or more control channels, data packets, preambles, etc. transmitted in a reverse channel between the wireless device pair.

The RF impairment information and/or other information regarding the signal (e.g., AM-AM, AM-PM, Volterra coefficients, and/or other performance metrics) fed back by the receiver wireless device is received by the transmitter wireless device at block 707 of flow 700 illustrated in FIG. 7. Thereafter, also at block 707, the wireless device originally having transmitted the signal (e.g., wireless device 305) operates to extract the information (e.g., through operation of RF impairments acquisition circuitry 360 as described above).

At block 708, the wireless device originally having transmitted the signal (e.g., wireless device 305) utilizes the information to synchronize the AM-AM, AM-PM, Volterra coefficients, and/or other performance metrics between the one or more intended receivers and the transmitter device. Thereafter, at block 709 of the illustrated embodiment, one or more model utilized by the transmitter device to model the impairments (e.g., non-linear and/or linear impairments) may be updated and parameters utilized by the precoder of the transmitter device may be correspondingly updated for transmission of subsequent signals to the one or more intended receivers. Such modeling of the impairments may be utilized by the transmitter wireless device to implement impairments correction. For example, the transmitter wireless device may perform non-linear correction of the transmit signal for the intended receiver wireless device based at least in part on the AM-AM indications, AM-PM indications, Volterra coefficient indications, and/or other performance metrics received from one or more receiver wireless devices. Accordingly, processing according to the illustrated configuration of flow 700 returns to block 701 wherein transmit processing of a transmit signal is again performed. This subsequent iteration of such transmit processing, however, utilizes the acquired RF impairments information and/or other information regarding transmitted signals to implement impairments correction (e.g., predistortion, precoding, etc. may be optimized for the overall communication channel utilizing the modeling information).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3 and 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for providing radio frequency (RF) impairments indications, comprising:
   estimating, by an intended receiver device for a signal, error vector magnitude (EVM) indications for the signal;
   determining, by the intended receiver device, if the EVM indications is above a threshold; and
   transmitting, by the intended receiver device to a transmitter device that transmitted the signal, the EVM indications when it is determined that the EVM indications is above the threshold.

2. The method of claim 1, further comprising:
   determining, by the intended receiver device, if one or more signal conditions is suitable for obtaining at least one RF impairments indication of the EVM indications for the signal;
   obtaining, at the intended receiver device, the at least one RF impairments indication if the one or more signal conditions is suitable for obtaining the at least one RF impairment indication.

3. The method of claim 2, further comprising:
   transmitting, by the intended receiver device to the transmitter device, either the at least one RF impairments indication when it is determined that the one or more signal conditions are suitable for obtaining the at least one RF impairments indication or signaling indicating that the signal conditions were insufficient for obtaining the at least one RF impairments indication when it is determined that the one or more signal conditions were not suitable for obtaining the at least one RF impairments indication.

4. The method of claim 2, wherein the at least one RF impairments indication comprises at least one of amplitude modulation (AM-AM) indications, phase modulation (AM-PM) indications, or Volterra coefficient indications estimated by the intended receiver device.

5. The method of claim 2, wherein the at least one RF impairments indication were measured by the intended receiver based upon a preamble of the signal transmitted by the transmitter device.

6. The method of claim 2, further comprising:
   receiving, by the receiver device, altered transmission of the signal by the transmitter device in response to the signaling by the intended receiver device indicating that the signal conditions were insufficient for obtaining the at least one RF impairments indication, wherein the altered transmission of the signal alters at least one aspect of the signal to facilitate obtaining the at least one RF impairments indication by the intended receiver device.

7. An apparatus configured for providing radio frequency (RF) impairments indications, the apparatus comprising:
   at least one processor; and
   a memory coupled to the at least one processor, wherein the at least one processor is configured:
   to estimate, at an intended receiver device for a signal, error vector magnitude (EVM) indications for the signal;
   to determine, at the intended receiver device, if the EVM indications is above a threshold; and
   to transmit, from the intended receiver device to a transmitter device that transmitted the signal, the EVM indications when it is determined that the EVM indications is above the threshold.

8. The apparatus of claim 7, wherein the at least one processor is further configured:
   to determine, at the intended receiver device, if one or more signal conditions is suitable for obtaining at least one RF impairments indication of the EVM indications for the signal;
   to obtain, at the intended receiver device, the at least one RF impairments indication if the one or more signal conditions is suitable for obtaining the at least one RF impairment indication.

9. The apparatus of claim 8, wherein the at least one processor is further configured:
   to transmit, from the intended receiver device to the transmitter device, either the at least one RF impairments indication when it is determined that the one or more signal conditions are suitable for obtaining the at least one RF impairments indication or signaling indicating that the signal conditions were insufficient for obtaining the at least one RF impairments indication when it is determined that the one or more signal conditions were not suitable for obtaining the at least one RF impairments indication.

10. The apparatus of claim 8, wherein the at least one RF impairments indication comprises at least one of amplitude modulation (AM-AM) indications, phase modulation (AM-PM) indications, or Volterra coefficient indications estimated by the intended receiver device.

11. The apparatus of claim 8, wherein the at least one processor is further configured:
   to receive, at the receiver device, altered transmission of the signal by the transmitter device in response to the signaling by the intended receiver device indicating that the signal conditions were insufficient for obtaining the at least one RF impairments indication, wherein the altered transmission of the signal alters at least one aspect of the signal to facilitate obtaining the at least one RF impairments indication by the intended receiver device.

12. The apparatus of claim 7, wherein the intended receiver device comprises dedicated test equipment operable to emulate a particular wireless device configuration.

13. An apparatus configured for providing radio frequency (RF) impairments indications, comprising:

means for estimating, by an intended receiver device for a signal, error vector magnitude (EVM) indications for the signal;

means for determining, by the intended receiver device, if the EVM indications is above a threshold; and means for transmitting, by the intended receiver device to a transmitter device that transmitted the signal, the EVM indications when it is determined that the EVM indications is above the threshold.

14. The apparatus of claim 13, further comprising:

means for determining, by the intended receiver device, if one or more signal conditions is suitable for obtaining at least one RF impairments indication of the EVM indications for the signal; and means for obtaining, at the intended receiver device, the at least one RF impairments indication if the one or more signal conditions is suitable for obtaining the at least one RF impairment indication.

15. The apparatus of claim 14, further comprising:

means for transmitting, by the intended receiver device to the transmitter device, either the at least one RF impairments indication when it is determined that the one or more signal conditions are suitable for obtaining the at least one RF impairments indication or signaling indicating that the signal conditions were insufficient for obtaining the at least one RF impairments indication when it is determined that the one or more signal conditions were not suitable for obtaining the at least one RF impairments indication.

16. The apparatus of claim 14, wherein the at least one RF impairments indication comprises at least one of amplitude modulation (AM-AM) indications, phase modulation (AM-PM) indications, or Volterra coefficient indications estimated by the intended receiver device.

17. The apparatus of claim 14, wherein the at least one RF impairments indication were measured by the intended receiver based upon a preamble of the signal transmitted by the transmitter device.

18. The apparatus of claim 14, further comprising:

means for receiving, by the receiver device, altered transmission of the signal by the transmitter device in response to the signaling by the intended receiver device indicating that the signal conditions were insufficient for obtaining the at least one RF impairments indication, wherein the altered transmission of the signal alters at least one aspect of the signal to facilitate obtaining the at least one RF impairments indication by the intended receiver device.

19. A non-transitory computer-readable medium having program code recorded thereon for providing radio frequency (RF) impairments indications, the program code comprising:

code to estimate, by an intended receiver device for a signal, error vector magnitude (EVM) indications for the signal;

code to determine, by the intended receiver device, if the EVM indications is above a threshold; and code to transmit, by the intended receiver device to a transmitter device that transmitted the signal, the EVM indications when it is determined that the EVM indications is above the threshold.

20. The non-transitory computer-readable medium of claim 19, wherein the program code further comprises:

code to determine, by the intended receiver device, if one or more signal conditions is suitable for obtaining at least one RF impairments indication of the EVM indications for the signal; and code to obtain, at the intended receiver device, the at least one RF impairments indication if the one or more signal conditions is suitable for obtaining the at least one RF impairment indication.

21. The non-transitory computer-readable medium of claim 20, wherein the program code further comprises:

code to transmit, by the intended receiver device to the transmitter device, either the at least one RF impairments indication when it is determined that the one or more signal conditions are suitable for obtaining the at least one RF impairments indication or signal to indicate that the signal conditions were insufficient for obtaining the at least one RF impairments indication when it is determined that the one or more signal conditions were not suitable for obtaining the at least one RF impairments indication.

22. The non-transitory computer-readable medium of claim 20, wherein the at least one RF impairments indication comprises at least one of amplitude modulation (AM-AM) indications, phase modulation (AM-PM) indications, or Volterra coefficient indications estimated by the intended receiver device.

23. The non-transitory computer-readable medium of claim 20, wherein the at least one RF impairments indication were measured by the intended receiver based upon a preamble of the signal transmitted by the transmitter device.

24. The non-transitory computer-readable medium of claim 20, wherein the program code further comprises:

code to receive, by the receiver device, altered transmission of the signal by the transmitter device in response to the signaling by the intended receiver device indicating that the signal conditions were insufficient for obtaining the at least one RF impairments indication, wherein the altered transmission of the signal alters at least one aspect of the signal to facilitate obtaining the at least one RF impairments indication by the intended receiver device.

\* \* \* \* \*